United States Patent [19]

Uffer et al.

[11] 4,081,660
[45] Mar. 28, 1978

[54] HEATER SHUTDOWN CIRCUIT

[75] Inventors: Michael B. Uffer, Baltimore; Clarence Wang, Silver Spring, both of Md.

[73] Assignee: Baxter Travenol Laboratories, Inc., Deerfield, Ill.

[21] Appl. No.: 702,650

[22] Filed: Jul. 6, 1976

[51] Int. Cl.² ............................................... H05B 1/02
[52] U.S. Cl. .................................. 219/504; 219/333; 219/501; 307/252 B; 307/310; 323/19
[58] Field of Search ............... 219/490, 494, 501, 504, 219/505, 322, 363, 487, 328, 333, 412.3; 323/19, 24; 307/252 B, 310

[56] References Cited

U.S. PATENT DOCUMENTS

| | | | |
|---|---|---|---|
| 2,549,095 | 4/1951 | Huck | 219/504 |
| 2,914,644 | 11/1959 | Holtkamp | 219/413 X |
| 3,003,048 | 10/1961 | Scott | 219/412 X |
| 3,500,074 | 3/1970 | Obenhaus | 307/310 |
| 3,803,385 | 4/1974 | Sandorf | 219/328 |
| 3,851,861 | 12/1974 | Cummins et al. | 219/328 |

*Primary Examiner*—J. V. Truhe
*Assistant Examiner*—Fred E. Bell
*Attorney, Agent, or Firm*—Henry W. Collins; Richard G. Kinney; Thomas R. Vigil

[57] ABSTRACT

The heater shutdown circuit is connected between an electric current source and a heating element in an electric heater and is operable to shut off the flow of current to the heating element when the heating element reaches a predetermined temperature and to maintain the flow of current shut off after the heating element cools to a temperature below the predetermined temperature. The heater shutdown circuit will maintain the electric current shut off until the heater shutdown circuit is disconnected from the current source for a predetermined period of time after which the heater shutdown circuit can be re-energized. The heater shutdown circuit includes a control circuit connected to the current source, a switching circuit coupled between the control circuit and the heating element, and a current sensing circuit coupled between the heating element and the junction between the control circuit and the switching circuit. It is operative in response to a decrease in current caused by an increase in the resistance of the heating element due to the overheating thereof to turn off the switching circuit. The control circuit is operative to turn on the switching circuit upon the initial energization of the shutdown circuit. Thereafter the control circuit reaches a steady-state condition where it is no longer operative to maintain the switching circuit turned on. However, subsequent to the turning on of the switching circuit by the control circuit, the current sensing circuit latches the switching circuit in a turned on condition until there is a decrease in the current through the heating element below a predetermined value.

18 Claims, 4 Drawing Figures

HEATER SHUTDOWN CIRCUIT

BACKGROUND OF THE INVENTION

1. Field Of The Invention

The field of the invention is an automatically operated, thermally responsive, current disconnecting circuit for a heating device. Circuits of this type are commonly referred to as heater shutdown circuits. Circuits and devices of this type are often found in Class 219, Subclass 510 and adjacent subclasses.

Most specifically, the present invention relates to a heater shutdown circuit which is operative to shut off current to an electric heating element when the resistance thereof increases due to the overheating thereof and is operative to maintain the current shut off even after the heating element cools.

The heater shutdown circuit is designed so that the heating element cannot be re-energized after the current has been shut off until the heater shutdown circuit has been de-energized for a predetermined period of time, after which the heater shutdown circuit can be re-connected to the current source to again energize the heating element.

2. Description Of The Prior Art

Heretofore, various control circuits have been proposed for controlling the current to an electric heating element in response to the temperature of the heating element. Examples of such control circuits are disclosed in the following U.S. Pat. Nos. 2,549,095; 2,722,595; 3,448,245; 3,546,436 and 3,614,392.

These previously proposed circuits have been operative either to shut off the current to the heating element completely after the temperature of the heating element exceeds a certain level or to shut off and turn on a heating element intermittently to maintain the temperature of the heating element within a preselected range. Typically, these control circuits are operative to re-energize the heating element once the heating element has cooled to a temperature below the preselected temperature. When there is a malfunction in the electric heater such that the heating element continues to overheat, the control circuit will cycle continuously, turning off and turning on the flow of current to the heating element. Although this type of operation is acceptable in many environments, it is not usually acceptable when the heating element is utilized for heating a liquid such as water in a hot water heater or cup or such as blood in a dialysis machine.

Accordingly, it is desirable to provide a heater shutdown circuit which will maintain a heating element shut off even after the heating element cools to a temperature below the temperature at which the circuit is actuated to turn off the flow of current to the heating element. One prior art circuit which utilizes transformers and relays and which has a secondary control to maintain an electric blanket de-energized after a malfunction occurs therein is disclosed in U.S. Pat. No. 2,549,095.

As will be described hereinafter in greater detail, the heater shutdown circuit of the present invention provides a circuit which utilizes electronic switching elements and which functions as follows:

(1) Initially passes current to the heating element;

(2) Shuts off the flow of current to the heating element once the temperature of the heating element exceeds a predetermined temperature;

(3) Maintains the flow of current to the heating element shut off after the heating element cools to a temperature below the predetermined temperature; and (4) Requires de-energization of the heater shutdown circuit for a predetermined time after which the heater shutdown circuit can be re-energized to re-energize the heating element.

In the prior art, electronic switching elements of the type utilized in the heater shutdown circuit of the present invention have been utilized in circuits for controlling the flow of current to various loads in electrical circuits. Examples of the use of electronic switching elements, such as transistors and triacs, for controlling the flow of current to a load can be found in the following U.S. Pat. Nos. 3,414,789; 3,566,198; 3,715,651; 3,742,337; 3,745,382; 3,760,157; 3,870,904 and 3,909,703.

These prior art control circuits utilizing electronic switching devices have not, however, provided a heater shutdown circuit having the particular circuit elements and circuit connections of the heater shutdown circuit of the present invention described more fully hereinafter. Moreover, such prior art control circuits do not operate in the same manner as the heater shutdown circuit of the present invention, which is operative, first, to energize a heating element, second, to shut off current to the heating element when the heating element exceeds a predetermined temperature, third, to maintain the flow of current to the heating element shut off after the heating element cools to a temperature below the predetermined temperature and fourth, to prevent re-energization of the heating element until the heater shutdown circuit is de-energized for a predetermined period of time after which it is again operable to energize a heating element.

SUMMARY OF THE INVENTION

According to the invention, there is provided a heater shutdown circuit which is connectible between an electric current source and a heating element in an electric heater and which comprises electronic means for shutting off electric current to the heating element when the heating element reaches a predetermined temperature, and electronic means for maintaining the flow of electric current to the heating element shut off after the heating element cools to a temperature below said predetermined temperature, said electronic means for maintaining the flow of electric current shut off being disabled only upon disconnection of said shutdown circuit from the current source for a predetermined period of time.

Most specifically, the electronic means for maintaining the electric current shut off comprises a control circuit and a switching circuit, the control circuit being connected to the current source and the switching circuit being coupled between the control circuit and the heating element. The electronic means for shutting off electric current to the heating element comprises a current sensing circuit which is coupled between the heating element and the junction between the control circuit and the switching circuit and which is operative in response to a decrease in current through the heating element caused by an increase in the resistance of the heating element due to the overheating thereof to turn off the switching circuit.

DESCRIPTION OF THE PREFERRED EMBODIMENTS

Figure 1:
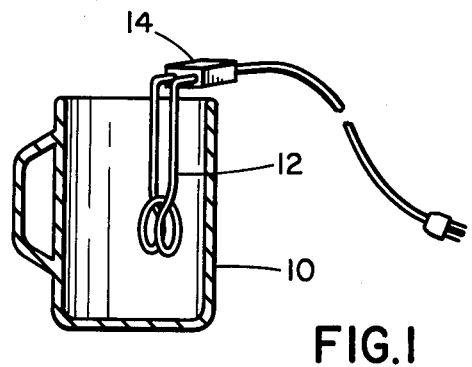
FIG. 1 is a vertical sectional view through a cup having positioned therein an electric heating element of an electric heater.

Referring to FIG. 1 there is illustrated therein a cup 10 having a heating element 12 of an electric heater 14 positioned therein. The heater 14 is of the type which is used for heating a single cup of water for making tea, instant tea, or instant coffee.

Figure 2:
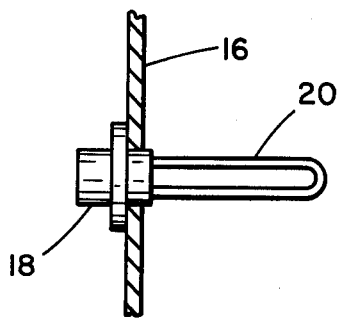
FIG. 2 is a fragmentary vertical sectional view through the wall of a water tank and shows an electric heating element mounted in the wall.

In FIG. 2 there is illustrated a side wall 16 of a water tank having mounted therein an electric heater 18. The heater 18 includes a hair-pin shaped heating element 20 which is disposed within the tank.

Both of the above described heating devices are designed to operate in a liquid such as water. However, if the level of water should fall below the heating element such that the heating element is exposed to air, it will quickly overheat, inasmuch as it is designed to transfer heat to water which has a much higher conductivity than air. The heater shutdown circuit of the present invention is designed to prevent such overheating.

Figure 3:
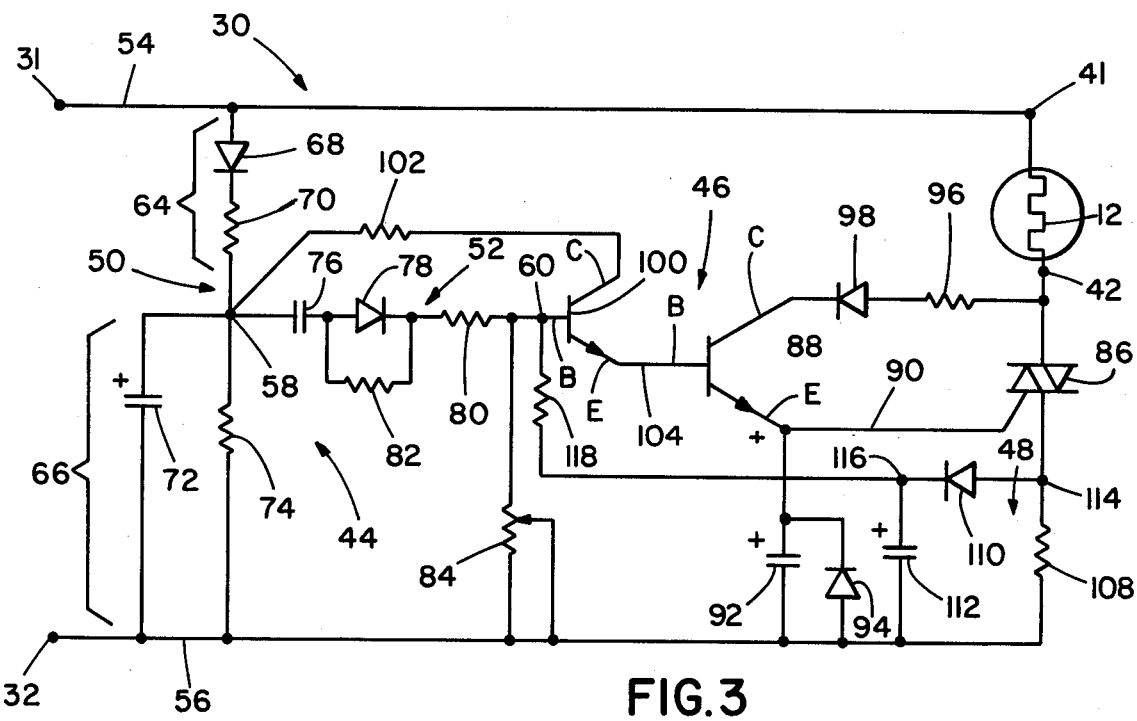
FIG. 3 is a schematic circuit diagram of one embodiment of the heater shutdown circuit of the present invention.

One embodiment of the heater shutdown circuit is illustrated in FIG. 3 and generally identified by the reference numeral 30. Although the heater shutdown circuit 30 can be utilized with either the heater 14 or the heater 18 it will be described with reference to the heater 14 and heating element 12 therein.

As shown, the heater shutdown circuit 30 has two input terminals 31 and 32 which are adapted to be connected to a source of alternating current (not shown). The circuit 30 also has two output terminals 41 and 42, to which the heating element 12 is connected. As a result, the circuit 30 can be easily connected into an electric heater during the manufacture thereof or can be sold as a separate unit to be connected between a heater and a current source.

The heater shutdown circuit 30 includes a control circuit 44, a switching circuit 46, and a current sensing circuit 48. The control circuit 44 includes two sub-circuits, namely, a voltage dividing circuit 50 and a "turn-on" or capacitor circuit 52. The voltage dividing circuit 50 is connected between a line 54 connected to terminal 31 and a line 56 connected to terminal 32, i.e., it is connected across the alternating current source.

The turn-on capacitor circuit 52 (hereinafter referred to simply as "the capacitor circuit 52") is coupled between a point or junction 58 in the voltage dividing circuit 50 and an input 60 to the switching circuit 46 and the current sensing circuit 48 is coupled between the heating element 12 and the input 60 to the switching circuit 46.

The voltage dividing circuit 50 includes a first branch 64 connected in series with a second branch 66 between the lines 54 and 56. The first branch 64 includes a diode 68 and a resistor 70 connected in series. The second branch 66 includes a capacitor 72 and a resistor 74 connected in parallel.

The capacitor circuit 52 includes a control capacitor 76, a diode 78 and a resistor 80 connected in series between the junction 58 of the voltage dividing circuit 50 and the input 60 to the switching circuit 46. The capacitor circuit 52 also includes a bleeder resistor 82 connected across the diode 78 and a variable resistance 84 connected between the input 60 to the switching circuit 46 and the line 56. Although referred to here as part of the capacitor circuit 52 because of its connection thereto, variable resistance 84 is functionally part of the current sensing circuit 48 since it is an adjustment for the current level at which switching circuit 46 "switches".

The switching circuit 46 includes a triac 86 connected in series with the heating element 12 and a portion of the current sensing circuit 48 as will be described in more detail hereinafter. The switching circuit 46 further includes a first electronic switching device or transistor 88 having its emitter E connected to a gate 90 of the triac 86. The emitter E and gate 90 are also coupled through a parallel connected capacitor 92 and diode 94 to the line 56. The collector circuit for the transistor 88 includes a resistor 96 and a diode 98 connected in series between the collector C and the output terminal 42 which is connected to the heating element 12. The switching circuit 46 further includes a second electronic switching device or transistor 100, having its base B connected to the input 60, having a collector circuit including a resistor 102 connected between its collector C and the junction 58 and having its emitter E connected to a control terminal 104 for the transistor 88. The control terminal 104 is the base B of the transistor 88. Likewise, the input or control terminal 60 is actually the base B of the transistor 100.

The current sensing circuit 48 includes a current sensing resistor 108 connected in series with the heating element 12 and the triac 86. If desired, the resistor 108 can be built into the heater 14 or 18. The current sensing circuit 48 further includes a diode 110 and a capacitor 112 connected in series across the resistor 108, i.e, from a junction 114 between the triac 86 and the current sensing resistor 108 to the line 56. A junction 116 between the diode 110 and the capacitor 112 is coupled by a resistance 118 to the input or control terminal 60 of the switching circuit 46.

The heater shutdown circuit 30 is designed to cut off current to the heating element 12 whenever the heating element 12 is removed from whatever liquid it is immersed in (such as water) or the liquid evaporates. In one realization of the heater shutdown circuit 30, the parameters for the circuit elements were chosen so that power to the heating element 12 would be shut off within about 15 seconds and would not be re-established again, even after the heating element has cooled, until the heater shutdown circuit 30 is disconnected from the current source for at least 15 seconds and then re-connected to the current source.

The heater shutdown circuit 30 operates as follows: When alternating current is applied to the terminals 31 and 32, the diode 68 allows capacitor 72 to charge through the resistor 70, during only the positive portion of the alternating current cycle. In the realization of the circuit 30 referred to above the circuit parameters of the voltage dividing circuit 50 were chosen so that the capacitor 72 charges to a D.C. voltage of about 25 volts at the junction 58 between resistors 70 and 74.

At the same time capacitor 72 is charging the control capacitor 76 in the capacitor circuit 52 begins to charge through the diode 78 and the resistors 80 and 82. This charging current through the capacitor circuit 52 is applied to the input 60 (base B) of the transistor 100 and turns on transistor 100 which in turn turns on transistor 88. When transistor 88 is conducting, diode 98 allows current to flow through the resistor 96 and the collector-emitter circuit of the transistor 98 only during the positive portion of the alternating current cycle. As a result, a D.C. voltage, which is filtered by the capacitor 92, appears on the emitter E of the transistor 88 and applied to the gate 90 of the triac 86. The triac 86 then turns on, allowing alternating current to flow through the heating element 12 and through the current sensing resistor 108. The voltage across the resistor 108 is rectified by the diode 110 and filtered to a D.C. level by the capacitor 112. This voltage, which is coupled by the resistance 118 to the base B of transistor 100, causes the base B of transistor 100 to stay forward biased holding transistor 100 in a conducting state after the control capacitor 76 is fully charged and no longer passes current to maintain transistor 100 turned on.

The heating element 12 is made of a wire conductor with a positive resistance temperature co-efficient so that when the heating element is removed from a liquid and increases in temperature as described above, it's resistance goes up and the current flowing through it goes down. Since the same current is flowing through the resistor 108 the voltage across the resistor 108 and the D.C. level at the junction 116 of the capacitor 112 and the diode 110 are reduced and will continue to reduce as the heating element gets hotter and its resistance continues to go up. As a result, when the voltage at the junction of the capacitor 112 and the diode 110 is no longer sufficient to forward bias base B of transistor 100, transistor 100 is turned off, causing transistor 88 and the triac 86 to be turned off. With the triac 86 turned off, no current can flow through the heating element 12 and, since there is no voltage developed across the current sensing resistor 108, there is no way for the circuit 30 to turn itself back on even after the heating element 12 cools to a temperature below the predetermined temperature at which transistor 100 is turned off. The only way to re-energize the heating element 12 is to discharge control capacitor 76 by turning off the A.C. power, i.e., by opening the circuit between the alternating current source and the terminals 31 and 32.

Figure 4:
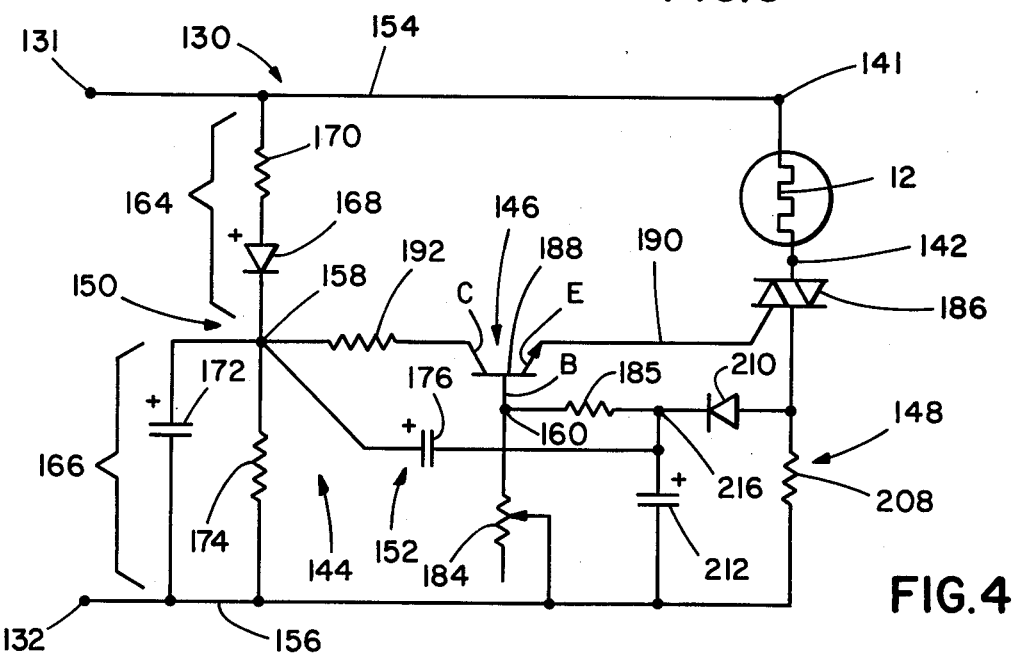
FIG. 4 is a schematic circuit diagram of another embodiment of the heater shutdown circuit of the present invention.

In FIG. 4 is shown another embodiment of the heater circuit of the present invention which is generally identified by the reference numeral 130. This simpler embodiment of the heater shutdown circuit, i.e., heater shutdown circuit 130, depends upon a triac which is of the sensitive gate type requiring a maximum trigger current of only 10 milliamps in any quadrant. This heater shutdown circuit 130 is designed for a 275 watt electric heater.

As shown, the heater shutdown circuit 130 includes input terminals 131 and 132, output terminals 141 and 142, across which the heating element 12 is connected, a control circuit 144, a switching circuit 146, and a current sensing circuit 148. Control circuit 144 includes a voltage dividing circuit 150 and a capacitor circuit 152. The voltage dividing circuit is connected between a line 154 connected to the terminal 131 and a line 156 connected to the terminal 132. The capacitor circuit 152 is coupled between a point or junction 158 in the voltage dividing circuit 150 and an input 160 to the switching circuit 146.

The voltage dividing circuit 150 includes a first branch 164 and a second branch 166 connected in series between the lines 154 and 156. The first branch includes a diode 168 and a resistor 170 connected in series. The second branch includes a capacitor 172 and a resistor 174 connected in parallel. The capacitor circuit 152 includes a control capacitor 176, as well as a variable resistance 184 connected between the input 160 to the switching circuit 146 and the line 156. It will be noted that the control capacitor 176 is coupled through a coupling resistor 185 to the input 160 of the switching circuit 146.

The switching circuit 146 includes a triac 186 and a transistor 188. The emitter E of the transistor 188 is connected to a gate 190 of the triac 186. The base B of the transistor 188 is connected directly to the input 160 of the switching circuit 146.

It will be readily apparent that the basic difference between the heater shutdown circuit 130 and the heater shutdown circuit 30 is that the heater shutdown circuit 130 shown in FIG. 4 only has two switching elements in the switching circuit 146, namely, triac 186 and transistor 188, whereas the heater shutdown circuit 30 has three switching elements in the switching circuit 46 thereof, namely, triac 86, transistor 88 and transistor 100.

As shown the collector circuit of the transistor 188 includes a resistor 192 connected between the junction 158 and the collector C of the transistor 188. The triac 186, of course, has its input and output terminals conncted respectively to the output terminal 142 and the current sensing circuit 148.

The current sensing circuit 148 includes a current sensing resistor 208 as well as diode 210 and a capacitor 212 connected in series across the current sensing resistor 208. Again, if desired, the resistor 208 can be built into the heater 14 or 18. A junction 216 between the diode 210 and the capacitor 212 is coupled by the coupling resistance 185 to the input 160 of the switching circuit 146, i.e., to the base B of transistor 188.

The heater shutdown circuit 130 operates in a manner very similar to the manner heater shutdown circuit 30 operates. In this respect, when A.C. current is applied to the terminals 131 and 132 the diode 168 allows capacitor 172 to charge through resistor 170 during only the positive portion of the A.C. cycle. Again, the parameters of the voltage dividing circuit 150 can be chosen such that a voltage of about 25 volts is developed at the junction 158. At the same time, the capacitor 176 begins charging to the voltage at the junction 158, i.e., to 25 volts. The charging current through the control capacitor 176 turns on transistor 188 which in turn causes a positive voltage to appear on the gate 190 of the triac 186. The triac 186 then turns on allowing current to flow through the heating element 12 and the current sensing resistor 108. The voltage across the current sensing resistor 108 is rectified by the diode 210 and filtered into a D.C. level by the capacitor 212. This voltage is applied via the coupling resistance 185 to the base B of the transistor 188 to cause the base B of transistor 188 to stay forward biased thereby to hold transistor 188 turned on after the control capacitor 176 is fully charged and no longer passes current to hold transistor 188 turned on.

Again, the heating element 12 is made of a wire conductor with a positive resistance temperature co-efficient so that when the heating element is removed from a liquid and the temperature of the element goes up, its resistance goes up and the current flowing through it goes down. Since this same current is flowing through the current sensing resistor 208, the voltage across the current sensing resistor 208 and the resulting D.C. level at the junction 216 go down. When the voltage at the junction 216 is no longer sufficient to forward bias the base B of transistor 188, the transistor 188 turns off. This also causes the triac 186 to turn off. With the triac 186 turned off no current can flow through the heating element 12. Since the control capacitor 176 is fully charged and since there is no voltage across the current sensing resistor 208, there is no way for the heater shutdown circuit 130 to turn on the switching circuit 146 to re-energize the heating element 12, even after the heating element 12 cools. The only way to re-energize the heating element 12 is to discharge control capacitor 176 by turning off the A.C. power to the circuit 30 for a short period of time. Once the circuit between the current source and the heater shutdown circuit 30 and 130 is interrupted, the control capacitor 76 or 176 is allowed to discharge through the resistors 74, 82, 80 and 84 or the resistors 174, 184, and 185, thereby to reset the circuit 30 or 130 for again energizing and protecting the heating element 12.

From the foregoing description it will be readily apparent that the heater shutdown circuit 30 or 130 of the present invention has a number of advantages some of which have been described above and others of which are inherent in the heater shutdown circuit. Accordingly, the scope of the invention is only to be limited as necessitated by the accompanying claims.

What is claimed is:

1. An electric heater shutdown circuit connectible between an electric current source and a heating element in an electric heater and comprising electronic means for shutting off electric current to the heating element when the heating element reaches a predetermined temperature, and electronic means for maintaining the flow of electric current to the heating element shut off after the heating element cools to a temperature below said predetermined temperature, said electronic means for maintaining said electric current shut off being disabled only upon disconnection of said shutdown circuit from the current source for a predetermined period of time.

2. The shutdown circuit according to claim 1 wherein said electronic means for maintaining said electric current shut off comprises a control circuit and a switching circuit, said control circuit being connected to the current source and said switching circuit being coupled between said control circuit and the heating element, and wherein said electronic means for shutting off electric current to the heating element comprises a current sensing circuit coupled between the heating element and the junction between said control circuit and said switching circuit and is operative in response to a decrease in current through the heating element caused by an increase in the resistance of the heating element due to the overheating thereof to turn off said switching circuit.

3. The shutdown circuit according to claim 2 wherein said switching circuit includes a triac having a gate, said triac being connected in series with the heating element and said current sensing circuit.

4. The shutdown circuit according to claim 3 wherein said switching circuit further includes a switching device having a control terminal, said switching device being connected between the current source and said triac gate and having said control terminal thereof coupled to said control circuit and to said current sensing circuit.

5. The shutdown circuit according to claim 3 wherein said switching circuit includes a first switching device which is coupled between the current source and said triac gate and which has a control terminal, and a second switching device which is coupled between the current source and said control terminal of said first switching device and which has a control terminal which is coupled to said control circuit and to said current sensing circuit.

6. The shutdown circuit according to claim 2 wherein said control circuit includes a voltage dividing circuit which is coupled to the current source and a capacitor circuit which is coupled between a point in said voltage dividing circuit and said switching circuit.

7. The shutdown circuit according to claim 6 wherein said voltage dividing circuit includes first and second branches connected across the current source, said first branch including a resistor and a diode connected in series, and said second branch including a resistor and a capacitor connected in parallel and wherein said capacitor circuit is connected to the junction between said first and second branches.

8. The shutdown circuit according to claim 6 wherein said capacitor circuit includes a control capacitor and a resistor connected in series between said voltage dividing circuit and said switching circuit and a resistance coupled between the connection of said capacitor circuit to said switching circuit and a line connected to one side of the current source.

9. The shutdown circuit according to claim 8 wherein said resistance is a variable resistance.

10. The shutdown circuit according to claim 8 wherein said capacitor circuit has a diode therein connected in series with said control capacitor and said resistor of said capacitor circuit.

11. The shutdown circuit according to claim 2 wherein said current sensing circuit includes a current sensing resistor which is coupled in series with the heating element and a coupling resistance which is connected between the junction between said current sensing resistor and the heating element and the junction between said control circuit and said switching circuit.

12. The shutdown circuit according to claim 11 wherein said current sensing circuit includes a diode and a capacitor which are connected in series across said current sensing resistor, said coupling resistance being connected between the junction of said capacitor and diode and said junction between said control circuit and said switching circuit.

13. The shutdown circuit according to claim 4 wherein said control circuit includes a voltage dividing circuit which is connected to the current source and a control capacitor which is coupled between a point in said voltage dividing circuit and said switching circuit.

14. The shutdown circuit according to claim 13 wherein said current sensing circuit includes a current sensing resistor which is connected in series with the heating element, said triac being connected between said current sensing resistor and the heating element, said current sensing circuit further includes a diode and a capacitor connected in series across said current sensing resistor, the junction between said diode and said capacitor being connected to said control capacitor, and both said control capacitor and said junction between said diode and said capacitor being coupled by a coupling resistance to an input of said switching circuit, and wherein a resistance is connected between said input of said switching circuit and a line connected to one side of the current source.

15. The shutdown circuit according to claim 5 wherein said control circuit includes a voltage dividing circuit and a capacitor circuit which is coupled between a point in said voltage dividing circuit and said control terminal of said second switching device and wherein a resistance couples said control terminal of said second switching device to a line connected to one side of the current source.

16. The shutdown circuit according to claim 15 wherein said current sensing circuit includes a current sensing resistor which is coupled in series with the heating element, the triac being connected between said current sensing resistor and the heating element, and a diode and a capacitor connected in series across said current sensing resistor, the junction between said diode and said capacitor being coupled to the control terminal of said second switching device.

17. The shutdown circuit according to claim 16 wherein said first switching device is a transistor having a collector, an emitter and a base which constitutes said control terminal, the collector circuit of said transistor including a resistor and a diode connected in series between a line connected to the other side of the current source and said collector, said emitter of said transistor being connected to said triac gate and wherein a diode and a capacitor are connected in parallel between said emitter and said line connected to one side of the current source.

18. An electric heater shutdown circuit connectible between an A.C. electric current source and a heating element in an electric heater, said shutdown circuit including control means for controlling current flow to the heating element, switching means for switching the current through the heating element on and off, said switching means being coupled between said control means and the heating element and including a first switching device which is connected in series with the heating element and which has a control terminal and a second switching device which is coupled between said control means and said control terminal of said first switching device and which has a control terminal connected to said control means, said control means including a control circuit operative in a transient/current-passing mode and a steady-state/current-blocking mode, said control circuit, upon initial energization of said shutdown circuit, being in said transient/current-passing mode thereby to supply current to said control terminal of said second switching device to turn on said second and first switching devices, and a current sensing circuit connected in series with the heating element and said first switching device and coupled to the control terminal of said second switching device, said current sensing circuit being operative to maintain said second switching device turned on after said control circuit has reached a steady state in said steady-state/current-blocking mode and being operative to turn off said second switching device when the current sensed by said current sensing circuit decreases below a certain value as a result of an increase in the resistance of said heating element due to the overheating thereof, said control circuit then being operative in its steady-state/current-blocking mode to prevent said switching circuit from being turned on after the heating element cools and the resistance thereof decreases and until said shutdown circuit is de-energized for a predetermined time period sufficient to reset said control circuit for again being operated in its transient/current-passing mode.

* * * * *